US008078526B1

(12) United States Patent
Lennon

(10) Patent No.: US 8,078,526 B1
(45) Date of Patent: Dec. 13, 2011

(54) PRINCIPAL FIRST LOAN PRODUCT

(75) Inventor: Michele V. Lennon, East Greenwich, RI (US)

(73) Assignee: Bank of America Corporation, Charlotte, NC (US)

( * ) Notice: Subject to any disclaimer, the term of this patent is extended or adjusted under 35 U.S.C. 154(b) by 12 days.

(21) Appl. No.: 12/031,792

(22) Filed: Feb. 15, 2008

(51) Int. Cl.
*G06Q 40/00* (2006.01)

(52) U.S. Cl. ............................................ 705/38; 705/35

(58) Field of Classification Search ............... 705/35–45
See application file for complete search history.

(56) References Cited

U.S. PATENT DOCUMENTS

| | | | | | |
|---|---|---|---|---|---|
| 5,870,721 | A | * | 2/1999 | Norris | 705/38 |
| 5,878,404 | A | * | 3/1999 | Stout et al. | 705/38 |
| 5,987,436 | A | * | 11/1999 | Halbrook | 705/36 R |
| 6,029,151 | A | * | 2/2000 | Nikander | 705/39 |
| 6,269,347 | B1 | * | 7/2001 | Berger | 705/38 |
| 6,778,968 | B1 | * | 8/2004 | Gulati | 705/36 R |
| 7,177,834 | B1 | * | 2/2007 | Maestle | 705/38 |
| 2001/0029482 | A1 | * | 10/2001 | Tealdi et al. | 705/38 |
| 2002/0040339 | A1 | * | 4/2002 | Dhar et al. | 705/38 |
| 2002/0040399 | A1 | * | 4/2002 | Nagashima | 709/227 |
| 2005/0144100 | A1 | * | 6/2005 | Shapiro et al. | 705/38 |
| 2005/0246267 | A1 | * | 11/2005 | Nichols | 705/38 |
| 2006/0015422 | A1 | * | 1/2006 | Dion | 705/35 |
| 2006/0085309 | A1 | * | 4/2006 | Tamura | 705/35 |
| 2009/0083171 | A1 | * | 3/2009 | Stipek et al. | 705/35 |

OTHER PUBLICATIONS

Toro Financing Program Website. Jun. 22, 2007. http://web.archive.org/web/20070622071048/http://www.toro.com/home/promotion/nopay_12months.html.*
MTGProfessor's website on Mortgage Prepayment Penalties. Nov. 27, 2006. http://www.mtgprofessor.com/a%20-%20options/prepayment_penalty.htm.*
Henry, Diane. Talking; Deferred Interest: Pro and Con. New York Times. Aug. 1, 1982. http://www.nytimes.com/1982/08/01/realestate/talking-deferred-interest-pro-con.html.*
UOB's News Release on New Mortgage Loans. Nov. 3, 2003. http://www.uobgroup.com.sg/assets/pdfs/about/news/2003/news_03nov03_homeloan.pdf.*
Consumer Affairs Article. "Interest_Free" Isn't, Suit Claims. Jan. 21, 2004. http://www.printthis.clickability.com/pt/cpt?action=cpt&title=Class+Action+Suit+Names+Home+Depot,+Lowe's,+Monogram+Credit+Card+Bank&expire=&urlID=23720010&fb=Y&url=http://www.consumeraffairs.com/news04/home_depot_lowes.html&partnerID=240777.*
Freddie Mac's Borrower Information Guide on Prepayment Penalties Mortgages. Aug. 2006. http://www.freddiemac.com/singlefamily/pdf/ppm.pdf.*
Home Ownership Accelerator FAQ's. Oct. 13, 2007. http://web.archive.org/web/20071013074607/http://www.homeownershipaccelerator.com/consumers/faq.shtml.*
GE CareCredit Credit Card FAQ. Jun. 15, 2005. http://web.archive.org/web/20050615134639/http://www.carecredit.com.au/Patients/Faq.html.*

* cited by examiner

*Primary Examiner* — Shahid Merchant
*Assistant Examiner* — Stephanie M Ziegle
(74) *Attorney, Agent, or Firm* — Michael A. Springs; Moore & Van Allen PLLC; James C. Edwards

(57) ABSTRACT

A principal first loan product that includes qualifying a borrower for a principal first loan, processing the principal first loan, and applying an entire amount of each payment from the borrower for the principal first loan to a principal of the principal first loan during a defined time period. The principal first loan may be a mortgage. The principal first loan may be re-amortized at a remaining loan principal balance and a remaining loan term after the defined time period. Each payment from the borrower received after the defined time period may be applied to the principal first loan in accordance with the re-amortization.

17 Claims, 3 Drawing Sheets

PRINCIPAL FIRST LOAN PRODUCT

BACKGROUND OF THE INVENTION

The present invention is related to loan products, and more specifically to a principal first loan product.

Currently, there are many types of loan products available and offered by different financial institutions. Traditional loan products require a borrower to make principal and interest payments with mostly interest being applied in the beginning years of the loan. Interest-only products require the borrower to pay interest-only payments, with nothing being applied to principal until after the interest-only period. Option adjustable rate mortgage (ARM) products allow a borrower to choose a payment option, but has the possibility of negative amortization. Current loan products help people afford a loan or mortgage but do not help them pay off the loan.

BRIEF SUMMARY OF THE INVENTION

According to one aspect of the present invention, a method for providing a principal first loan includes qualifying a borrower for a principal first loan, processing the principal first loan, and applying the entire amount of each payment from the borrower for the principal first loan to a principal of the principal first loan during a defined time period. After the defined period, the loan is re-amortized at the remaining principal balance, remaining term, and agreed upon interest rate, thereby, lowering the payments due thereafter.

According to another aspect of the present invention, a system for providing a principal first loan includes an origination subsystem, the origination subsystem receiving and pre-qualifying borrowers for a principal first loan, a processing subsystem, the processing subsystem processing, underwriting, and closing the principal first loan, and a servicing subsystem, the servicing subsystem applying an entire amount of each payment from the borrower for the principal first loan to a principal of the principal first loan during a defined time period.

According to a further aspect of the present invention, an apparatus comprising a storage medium with instructions stored therein, the instructions when executed causes a processing device to perform: qualifying a borrower for a principal first loan, processing the principal first loan, and applying an entire amount of each payment from the borrower for the principal first loan to a principal of the principal first loan during a defined time period.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
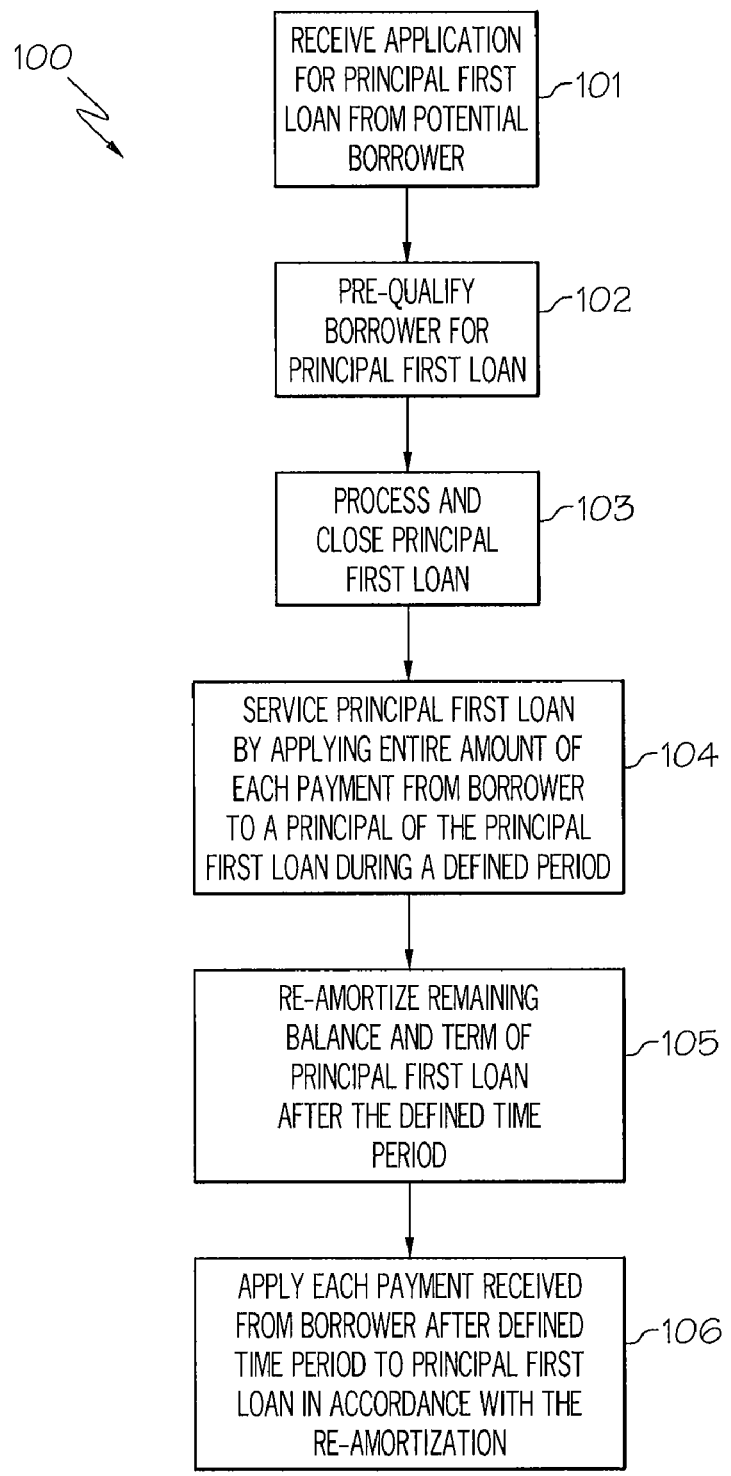
FIG. 1 is a flowchart of a process for providing a principal first loan according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention provide a principal first loan that allows a borrower to make principal-only payments toward a loan during a defined period of the life of the loan without accruing interest. After the defined period, the remaining loan balance and the remaining period are re-amortized and any future payments from the borrower are applied to principal and interest of the re-amortized loan accordingly. Thus, the borrower builds equity faster by having essentially a zero percent interest rate for the defined period and after the defined period, the borrower may benefit from a lower payment after the loan is re-amortized.

The defined period may be a set number of months, a set number of years or a combination thereof. For example, a borrower may pay principal only on the loan for a period of six months after which the remaining balance and loan term may be re-amortized with principal and interest and subsequent payments made by the borrower applied to both the principal and interest based on the re-amortization period. Further, the set period may be one year, a year and a half, etc. To illustrate embodiments of the present invention, as an example, let's assume the loan is a $300,000.00 mortgage at 7% for 30 years and the defined period is 12 months. A borrower may then pay $1,995.91 a month during the defined period of 12 months (i.e., 12 payments) where the entire amount of each $1,995.91 payment goes towards the principal only of the loan. At the end of the 12 months, a principal and interest payment may be calculated based on the remaining loan balance and the remaining loan term (i.e., 29 years). Assuming no additional payments, this may be approximately $276,049.08 at 7% for 29 years thus, resulting in the borrower paying principal and interest payments totaling $1,855.41 for the remaining 29 year term.

Embodiments according to the present invention may be advantageous for a fixed-rate borrower who has a mortgage on a property and may be staying in the property for a while. Further, embodiments according to the present invention, may allow a borrower to secure a loan for a home even at a higher loan-to-value, and be able to pay the down payment over time. In addition, the payment amount during the defined period may not be any higher than if the borrower was making principal and interest payments during the defined period. Moreover, the principal and interest payments for the remaining loan balance after the defined period may be lower than the payment during the defined period. According to embodiments of the present invention, a provider of the loan may desire to impose a penalty if a borrower pays off the loan within a certain time period. For example, a provider of the loan may assess a penalty in the form of a percentage of the balance of the loan if the borrower pays off the loan within, for example, five years. Further, according to embodiments of the present invention, a provider of the loan may provide the loan at a higher interest rate than normal, or may require an initial up front fee for providing the loan to the borrower.

Moreover, providing a principal first loan according to embodiments of the present invention may be automatically performed by various subsystems, may be performed by administrators, or a combination thereof. For example, in an embodiment according to the present invention, an origination subsystem may include a processor that controls receiving loan requests from borrowers, pre-qualifying the borrowers for a principal first loan, and forwarding this information to a processing subsystem. The processing subsystem may include a processor that may perform underwriting and closing operations on borrower's principal first loan application and forward information related to the underwriting and closing of the principal first loan to a servicing subsystem. The servicing subsystem may include a processor that may service distribution of payments received from borrowers for the principal first loan where the payments are entirely applied to a principal of the principal first loan during a defined time period, perform re-amortization of the remaining balance and term of the principal first loan after the defined time period, and apply subsequent payments received from borrowers after the defined time period to the remaining principal and interest of the remaining balance in accordance with the re-amortization period.

In addition, the operations at the communication subsystem, processing subsystem, and servicing subsystem may be performed by one or more individuals manually, or may be performed by one or more individuals in combination with a workstation and/or a processor at the specific subsystem. Therefore, embodiments according to the present invention may include a completely automated system for providing a principal first loan to borrowers, may include one or more individuals performing various tasks for providing a principal first loan to customers, or may include a combination thereof.

FIG. 1 shows a flowchart of a process for providing a principal first loan according to an example embodiment of the present invention. In the process 100, in block 101, an application for a principal first loan may be received from a potential borrower. In block 102, the borrower may be pre-qualified for the principal first loan. In block 103, the principal first loan may be processed and closed. In block 104, the principal first loan may be serviced by applying an entire amount of each payment received from the borrower to a principal of the principal first loan during a defined period. In block 105, a remaining balance and remaining term of the principal first loan may be re-amortized after the defined time period. In block 106, each payment received from the borrower after the defined time period and the re-amortization may be applied to the remaining principal and interest and remaining term of the principal first loan in accordance with the re-amortization.

Figure 2:
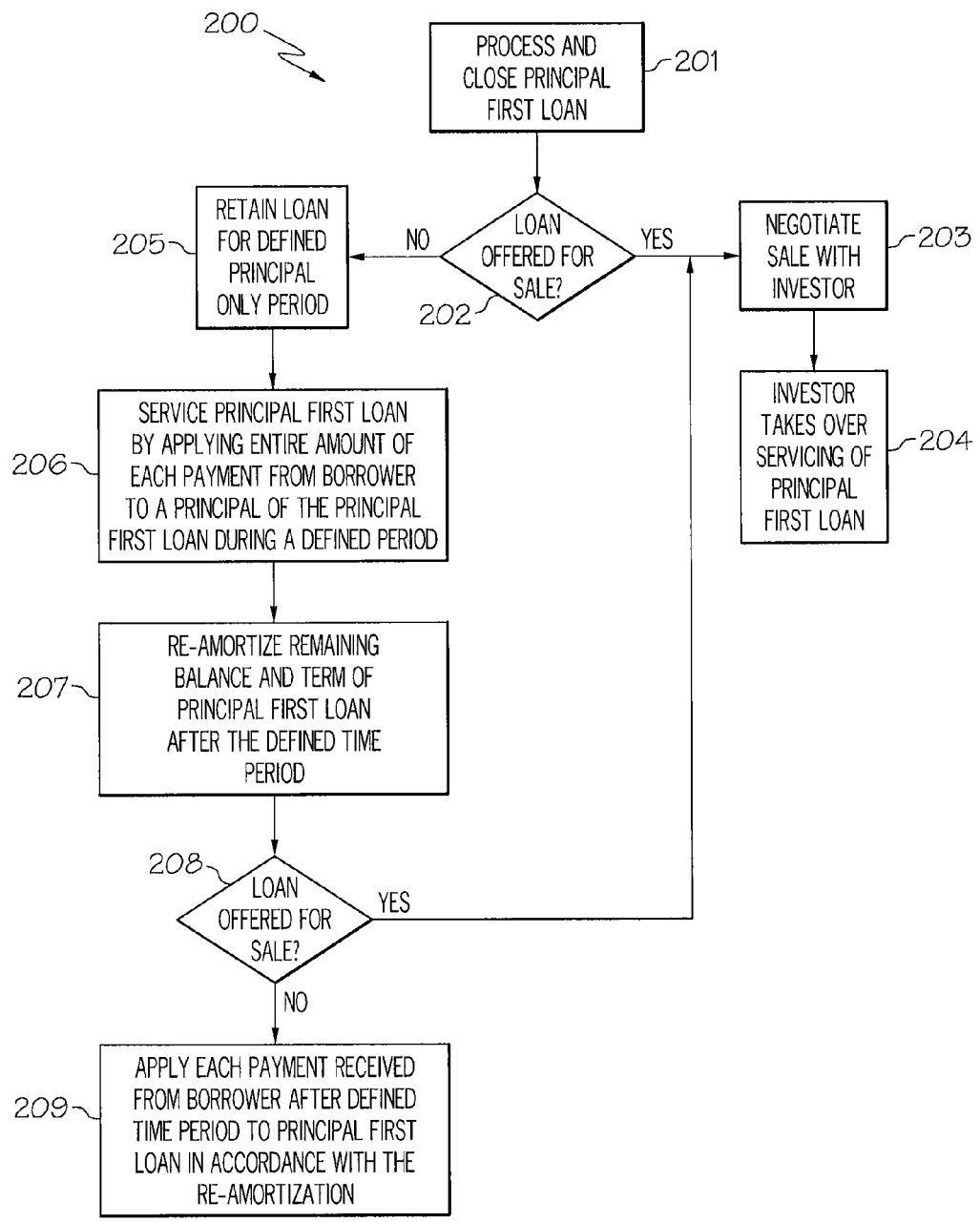
FIG. 2 is a flowchart of a process for transferring a principal first loan according to an example embodiment of the present invention.

FIG. 2 shows a flowchart of a process for transferring a principal first loan according to an example embodiment of the present invention. In the process 200 in block 201, the principal first loan may be processed and closed. In block 202, it may be decided if it is desired to offer the principal first loan for sale and if so, in block 203, a negotiation of the sale of the principal first loan with an investor (or other entity) may occur. Then in block 204, the investor may take over servicing of the principal first loan.

If the loan was not offered for sale after processing and closing, then in block 205, the loan may be retained by the current financial institution for the defined principal only period. In block 206, the principal first loan may be serviced by applying an entire amount of each payment received from a borrower to a principal of the principal first loan during a defined period. In block 207, a remaining balance (principal and interest) and term of the principal first loan may be re-amortized after the defined time period. In block 208, it may be determined if the loan is to be offered for sale and if so, in block 203 a negotiation with an investor (or other entity) for sale of the principal first loan may occur. Then in block 204 the investor may take over servicing of the principal first loan. If the loan is not offered for sale, then in block 209, each payment received from the borrower after the defined time period may be applied to a remaining principal and interest of the principal first loan in accordance with the re-amortization.

Figure 3:
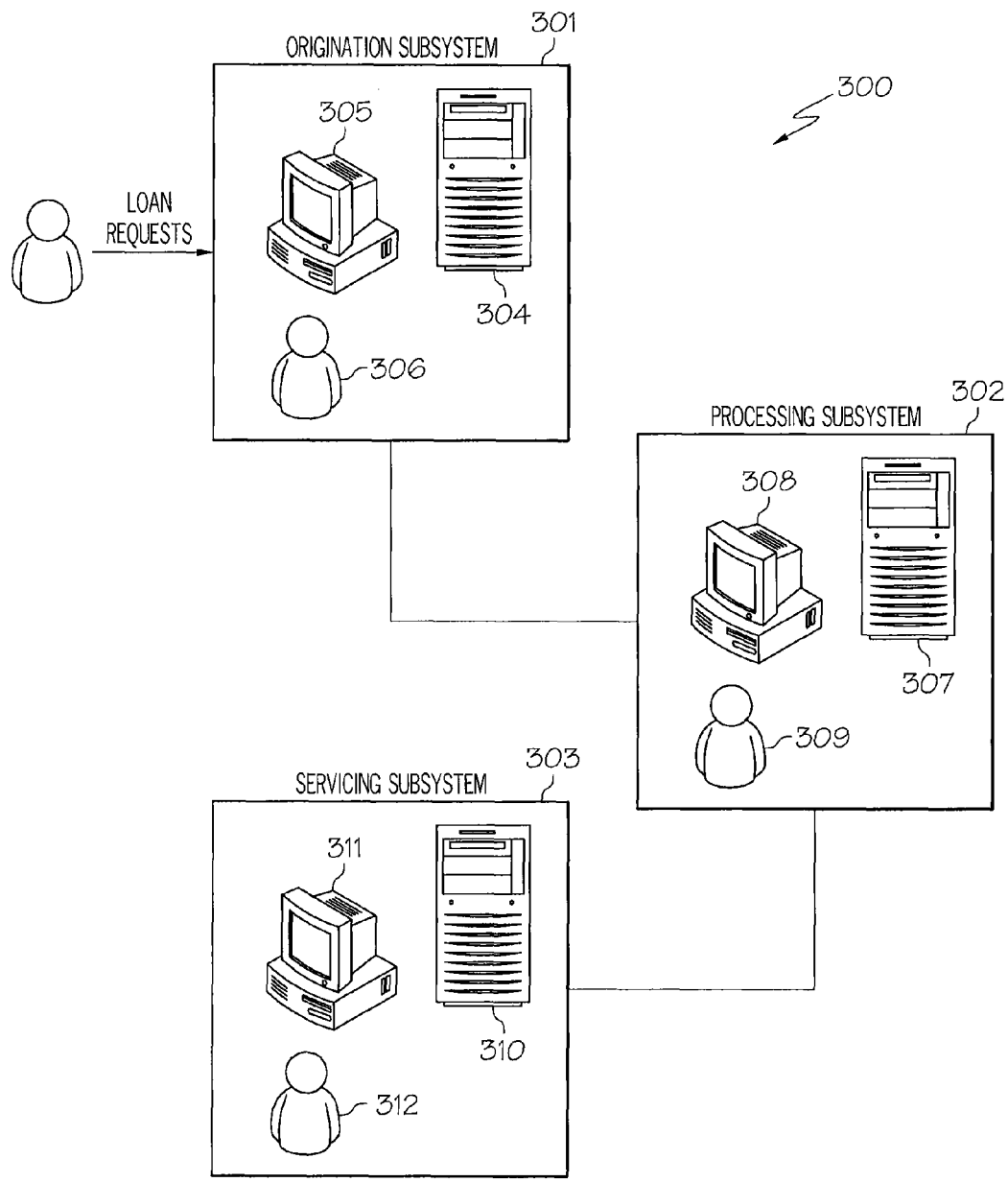
FIG. 3 is a system for a principal first loan according to an example embodiment of the present invention.

FIG. 3 shows a system for a principal first loan according to an example embodiment of the present invention. The system 300 may include a loan origination subsystem 301, a processing subsystem 302, and a servicing subsystem 303. The loan origination subsystem 301, the processing subsystem 302, and the servicing subsystem 303 may be operatively connected and communicate. The origination subsystem 301 may include a processor 304, and/or a workstation 305, and/or one or more administrators or individuals 306. The origination subsystem 301 may receive loan requests from borrowers and may pre-qualify borrowers for a principal first loan. The processing subsystem 302 may include a processor 307, and/or a workstation 308, and/or one or more administrators or individuals 309. The processing subsystem 302 may receive information from the origination subsystem 301 and use this information to process, underwrite, and close the principal first loan for a borrower. The servicing subsystem 303 may include may include a processor 310, and/or a workstation 311, and/or one or more administrators or individuals 312. The servicing subsystem 303 may receive information from the processing subsystem 302 and/or the origination subsystem 301 that may be used to help the servicing subsystem 303 service a principal first loan by applying an entire amount of each payment received from a borrower for a principal first loan to a principal of the principal first loan during a defined time period. The servicing subsystem 303 may also re-amortize the principal first loan remaining balance and term after the defined time period and apply each payment subsequently received from a borrower for the principal first loan to the principal first loan remaining loan principal and remaining loan term in accordance with the re-amortization.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for providing a principal-first home mortgage loan comprising:

qualifying a borrower for a principal-first home mortgage loan;

processing, by a computing device processor, the principal-first home mortgage loan, wherein processing includes at least one of charging the borrower a one-time up-front fee or charging the borrower an above-market interest rate;

applying, by a computing device processor, an entire amount of each payment received from the borrower for the principal-first home mortgage loan to a principal of the principal-first home mortgage loan during a defined time period, such that a total amount applied to the principle during the defined time period is less than a total principle-first home mortgage loan amount;

automatically, re-amortizing, by a computing device processor, the principal-first home mortgage loan at a remaining loan principal balance and a remaining loan term after the defined time period; and applying, by a computing device processor, each payment from the borrower received after the defined time period to the principal-first home mortgage loan in accordance with the re-amortization, wherein the principal-first home mortgage loan does not accrue interest during the defined time period and wherein a first required per period payment amount received during the defined time period does not exceed a second required per period payment amount, wherein the second required per period payment amount is a payment amount the borrower would pay if the borrower was making principal and interest payments on the loan during the defined time period.

2. The method according to claim 1, further comprising underwriting and closing the principal-first home mortgage loan during the processing.

3. The method according to claim 1, further comprising the defined time period comprising one of a set number of months or a set number of years.

4. The method according to claim 1, further comprising charging, by a computing device processor, the borrower a penalty when the borrower pays off a remaining balance of the principal-first home mortgage loan within a defined second time period.

5. The method according to claim 4, further comprising charging, by a computing device processor, the borrower a penalty comprising a percentage of the remaining balance.

6. The method according to claim 4, further comprising charging, by a computing device processor, the borrower a penalty comprising a monetary fee.

7. The method according to claim 1, further comprising approving, by a computing device processor, the principal-first home mortgage loan responsive to the processing and selling the principal-first home mortgage loan to an investor.

8. The method according to claim 1, further comprising approving, by a computing device processor, the principal-first home mortgage loan responsive to the processing and selling the principal-first home mortgage loan to an investor after the defined time period.

9. A system for providing a principal-first home mortgage loan comprising:
- an origination subsystem device including a first processor and a first memory in communication with the processor, wherein the first processor is configured to receive and pre-qualify borrowers for a principal-first home mortgage loan;
- a processing subsystem device including a second processor and a second memory in communication with the processor, wherein the second processor is configured to process, underwrite and close the principal-first home mortgage loan, wherein processing includes at least one of charging the borrower a one-time up-front fee or charging the borrower an above-market interest rate; and
- a servicing subsystem device including a third processor and a third memory in communication with the processor, wherein the third processor is configured to apply an entire amount of each payment received from the borrower for the principal-first home mortgage loan to a principal of the principal-first home mortgage loan during a defined time period, automatically re-amortize the principal-first home mortgage loan at a remaining loan principal balance and a remaining loan term after the defined time period and apply each payment from the borrower received after the defined time period to the principal-first loan in accordance with the re-amortization,
- wherein the principal-first home mortgage loan does not accrue interest during the defined time period and a total amount applied to the principle during the defined time period is less than a total principle-first home mortgage loan amount and wherein a first required per period payment amount received during the defined time period does not exceed a second required per period payment amount, wherein the second required per period payment amount is a payment amount the borrower would pay if the borrower was making principal and interest payments on the loan during the defined time period.

10. The system according to claim 9, wherein the origination subsystem device comprises at least one of a server, or a workstation.

11. The system according to claim 9, wherein the processing subsystem device comprises at least one of a server, or a workstation.

12. The system according to claim 9, wherein the servicing subsystem device comprises at least one of a server, or a workstation.

13. An apparatus comprising a non-transitory computer readable storage medium with computer-executable instructions stored therein, the instructions when executed causing a processing device to perform:
- qualifying a borrower for a principal-first home mortgage loan;
- processing the principal-first home mortgage loan, wherein processing includes at least one of charging the borrower a one-time up-front fee or charging the borrower an above-market interest rate;
- applying an entire amount of each payment received from the borrower for the principal-first home mortgage loan to a principal of the principal-first home mortgage loan during a defined time period, such that a total amount applied to the principle during the defined time period is less than a total principle-first home mortgage loan amount;
- automatically, re-amortizing the principal-first home mortgage loan at a remaining loan principal balance and a remaining loan term after the defined time period; and
- applying each payment from the borrower received after the defined time period to the principal-first home mortgage loan in accordance with the re-amortization,
- wherein the principal-first home mortgage loan does not accrue interest during the defined time period and wherein a first required per period payment amount received during the defined time period does not exceed a second required per period payment amount, wherein the second required per period payment amount is a payment amount the borrower would pay if the borrower was making principal and interest payments on the loan during the defined time period.

14. The system according to claim 9, wherein the second processor of the servicing subsystem is further configured to charge the borrower a penalty when the borrower pays off a remaining balance of the principal-first home mortgage loan within a defined second time period.

15. The system according to claim 9, wherein the first processor of the processing system is further configured to approve the principal-first home mortgage loan responsive to the processing and selling the principal-first home mortgage loan to an investor.

16. The apparatus of claim 13, wherein the instructions when executed cause the processing device to further perform charging the borrower a penalty when the borrower pays off a remaining balance of the principal-first home mortgage loan within a defined second time period.

17. The apparatus of claim 13, wherein the wherein the instructions when executed cause the processing device to further perform approving the principal-first home mortgage loan responsive to the processing and selling the principal-first home mortgage loan to an investor.

* * * * *